(12) United States Patent
Carnick et al.

(10) Patent No.: US 11,095,105 B2
(45) Date of Patent: Aug. 17, 2021

(54) POWER DISTRIBUTION BOX

(71) Applicant: Sumitomo Wiring Systems, Ltd., Mie (JP)

(72) Inventors: Brian Carnick, Farmington Hills, MI (US); Bennie Malcom, Farmington Hills, MI (US); Martin Magda, Farmington Hills, MI (US)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 131 days.

(21) Appl. No.: 16/459,669

(22) Filed: Jul. 2, 2019

(65) Prior Publication Data

US 2021/0006054 A1    Jan. 7, 2021

(51) Int. Cl.
*H02G 3/08* (2006.01)

(52) U.S. Cl.
CPC .................................. *H02G 3/081* (2013.01)

(58) Field of Classification Search
CPC .......... B60R 16/023; H02G 1/14; H02G 3/16; H02G 3/08; H02G 3/14; H02G 3/081; H05K 7/06; H01R 13/518
USPC ......................................................... 174/500
See application file for complete search history.

(56) References Cited

U.S. PATENT DOCUMENTS

| | | | | |
|---|---|---|---|---|
| 5,621,192 A | * | 4/1997 | Bordwell | H02G 3/14 174/67 |
| 5,703,325 A | * | 12/1997 | Yamaguchi | H02G 3/088 174/50 |
| 6,561,822 B2 | * | 5/2003 | Depp | H05K 7/026 439/521 |
| 6,570,088 B1 | * | 5/2003 | Depp | B60R 16/0238 174/50 |
| 6,796,808 B2 | * | 9/2004 | Hosoe | H01R 9/226 361/826 |
| 9,698,583 B1 | * | 7/2017 | Matsumura | H02G 3/088 |
| 10,667,413 B1 | * | 5/2020 | Carnick | H05K 5/0069 |
| 2002/0135983 A1 | * | 9/2002 | Freitas | H05K 7/1432 361/704 |
| 2012/0064741 A1 | * | 3/2012 | Kawaguchi | H05K 5/0026 439/76.2 |
| 2014/0247554 A1 | * | 9/2014 | Sharma | H01F 27/28 361/695 |
| 2014/0312031 A1 | * | 10/2014 | Kaneko | B60R 16/0238 220/3.8 |

* cited by examiner

*Primary Examiner* — Timothy J Thompson
*Assistant Examiner* — Michael F Mcallister
(74) *Attorney, Agent, or Firm* — Honigman LLP

(57) ABSTRACT

A power distribution box for housing electrical components configured to retain its shape so as to retain a tight fit and the integrity of a storage space is provided. The power distribution box includes an upper housing assembly. The upper housing assembly is configured to couple with a bottom cover. The bottom cover includes a bottom wall bounding a peripheral edge of a floor so as to define a storage compartment for which electric components are housed. The bottom wall includes an outer wall opposite of an inner wall so as to define an opening there between. A top lateral wall closes off a top of the opening so as to define an open bottom between the inner wall and the outer wall. The top lateral wall provides structural rigidity to the bottom wall so as to prevent the bottom wall from warping.

11 Claims, 4 Drawing Sheets

POWER DISTRIBUTION BOX

TECHNICAL FIELD

The present specification generally relates to a power distribution box for housing electrical components having a reinforced bottom cover.

BACKGROUND

Power distribution boxes are used to distribute power throughout an electric system. The power distribution box houses electric components. Power distribution boxes are made using material suitable for injection molding processes such as, polymers, polypropylene and the like.

The power distribution box includes an upper housing assembly and a bottom cover. The bottom cover includes a bottom wall bounding the peripheral edge of a floor so as to define a storage space for holding electric components. The upper housing assembly is configured to cover the bottom cover, wherein a peripheral edge of the upper housing assembly is seated to the bottom wall, closing the storage space and preventing debris and water from entering the storage space.

The bottom wall is generally a planar member which is generally orthogonal to the floor. Currently, the bottom wall is a single sheet of material made of a material suitable for injection molding, such as polypropylene and thus may warp, bend or flex. An opening may be created between the upper housing assembly and the bottom wall when the bottom wall warps, bend or flex. The opening may expose the storage space to the environment and thus the electric components may fail.

To add rigidity to the bottom wall, ribs are disposed to reinforce the bottom wall so as to retain the form of the bottom wall and prevent opening from occurring. In particular, the ribs are disposed on the floor and attached to the inner surface of the bottom wall. However, the ribs do not provide sufficient structure to retain the bottom wall in a rigid and upright manner and thus, an opening may occur.

Accordingly, it remains desirable to have a power distribution box wherein the bottom cover retains its dimension so as to ensure coupling with the upper housing assembly so as to prevent previous warping and deformation of the bottom wall occurring in the prior art.

SUMMARY

A power distribution box for housing electrical components is provided. The power distribution box is configured to retain its shape so as to retain a tight fit and the integrity of a storage space. The power distribution box includes an upper housing assembly. The upper housing assembly is configured to couple with a bottom cover. The bottom cover includes a bottom wall bounding a peripheral edge of a floor so as to define a storage compartment for which electric components are housed.

The bottom wall includes an outer wall opposite of an inner wall so as to define a gap there between. A top lateral wall closes off a top of the gap so as to define an open bottom between the inner wall and the outer wall. The top lateral wall provides structural rigidity to the bottom wall so as to prevent the bottom wall from warping.

In one aspect, the bottom wall further includes a side lateral wall. The side lateral wall is disposed on a plane orthogonal to the top lateral wall. The side lateral wall extends between the inner wall and the outer wall so as to divide the opening along a height of the inner wall.

In another aspect of the disclosure, the power distribution box includes a rib. The rib is disposed on a top surface of the lateral wall and an inner surface of the outer wall so as to provide rigidity to a top portion of the outer wall.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION OF PREFERRED EMBODIMENTS

Referring generally to the figures, embodiments of a power distribution box are provided. The power distribution box includes an upper housing assembly and a bottom cover. The upper housing assembly is mounted to the bottom cover so as to protect the contents within the space of the bottom cover. The bottom includes a bottom wall bounding a peripheral edge of a floor so as to define a storage compartment for which electric components may be housed. The bottom wall includes an inner wall that is opposite of an outer wall so as to define a gap there between. The bottom cover further includes a top lateral wall extending between the inner wall and the outer wall so as to close off a top of the gap and define a bottom opening between the outer wall and the inner wall. The top lateral wall provides rigidity to the outer wall with respect to the inner wall so as to help the outer wall retain its shape.

Figure 1:
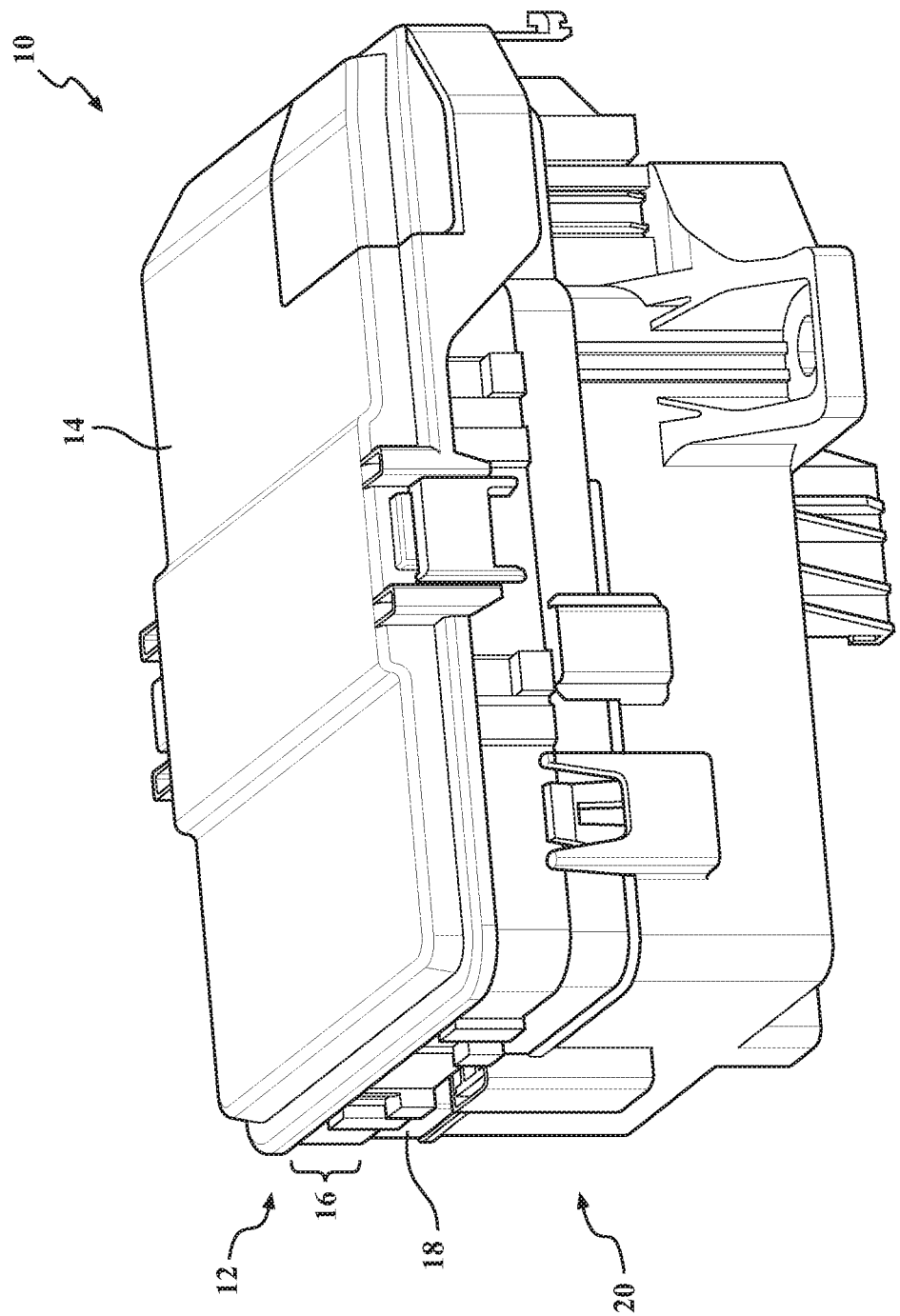
FIG. 1 is a respective view of a power distribution box.

With reference now to FIG. 1, a perspective view of a power distribution box 10 is provided. The power distribution box 10 is formed through the injection molding process. The power distribution box 10 is formed of materials suitable for injection molding. Any material suitable for injection molding may be used herein illustratively including polypropylene, polyamide and the like.

The power distribution box 10 is configured to house electric components (not shown). The power distribution box 10 includes an upper housing assembly 12. The upper housing assembly 12 may include a top cover 14, an upper housing 16 and a lower housing 18. The top cover 14 and the upper housing 16 may be coupled together using any known fastening mechanism currently known or later developed. The upper housing 16 and the lower housing 18 are coupled together so as to define a singular unit housing electronic components configured to distribute power. The upper storage space is closed by the top cover 14.

The power distribution box 10 further includes a bottom cover 20 is configured to receive the upper housing assembly 12. A description of the bottom cover 20 will be made with reference to FIG. 1 and also FIGS. 2 and 3. FIG. 1 shows a plurality of conventional fastening means configured to couple the upper housing assembly 12 with the bottom cover 20. It should be appreciated that the side walls of the upper housing assembly 12 and the bottom wall 26 of the bottom cover 20 are dimensioned to register with each other so as to close off the electric components from the environment. As such, any deformation or warping of the bottom wall 26 may create openings to allow for substances such as water, dust or other debris to enter into the power distribution box 10 and potentially cause the electronic components held therein to fail.

With reference again to FIG. 2, a top down view of the bottom cover 20 is provided. The bottom cover 20 may include a terminal housing 22 disposed along an open side of the bottom cover 20. Attachment portions 24 are provided on the exterior of the bottom cover 20 for attaching the power distribution box 10 to structure such as the engine compartment of an automotive vehicle. It should be appreciated that the location of the attachment portions 24 are shown for illustrative purposes and that the attachment portions may be located otherwise.

The bottom cover includes a bottom wall 26 and a floor 28. The bottom wall 26 and the floor 28 may be formed through injection molding as a unitary piece. The bottom wall 26 bounds a portion of a peripheral edge of a floor 28 so as to define a pair of side bottom walls 26a, a front bottom wall 26b and a back bottom wall 26c.

The bottom wall 26 has a generally rectangular dimension. However, it should be appreciated that the bottom wall 26 may bound a geometry other than a rectangular shape based upon the packaging needs of the power distribution box 10. The terminal housing 22 is disposed on a portion of the floor 28 exterior to the front bottom wall 26b and is open to the environment so as to accommodate terminal wires (not shown). The inner surface of the floor 28 may include partitions 30 configured to hold electric components such as a connector assembly (not shown). For illustrative purposes, the partitions 30 are dimensioned to accommodate a pair of connector assemblies.

Figure 3:
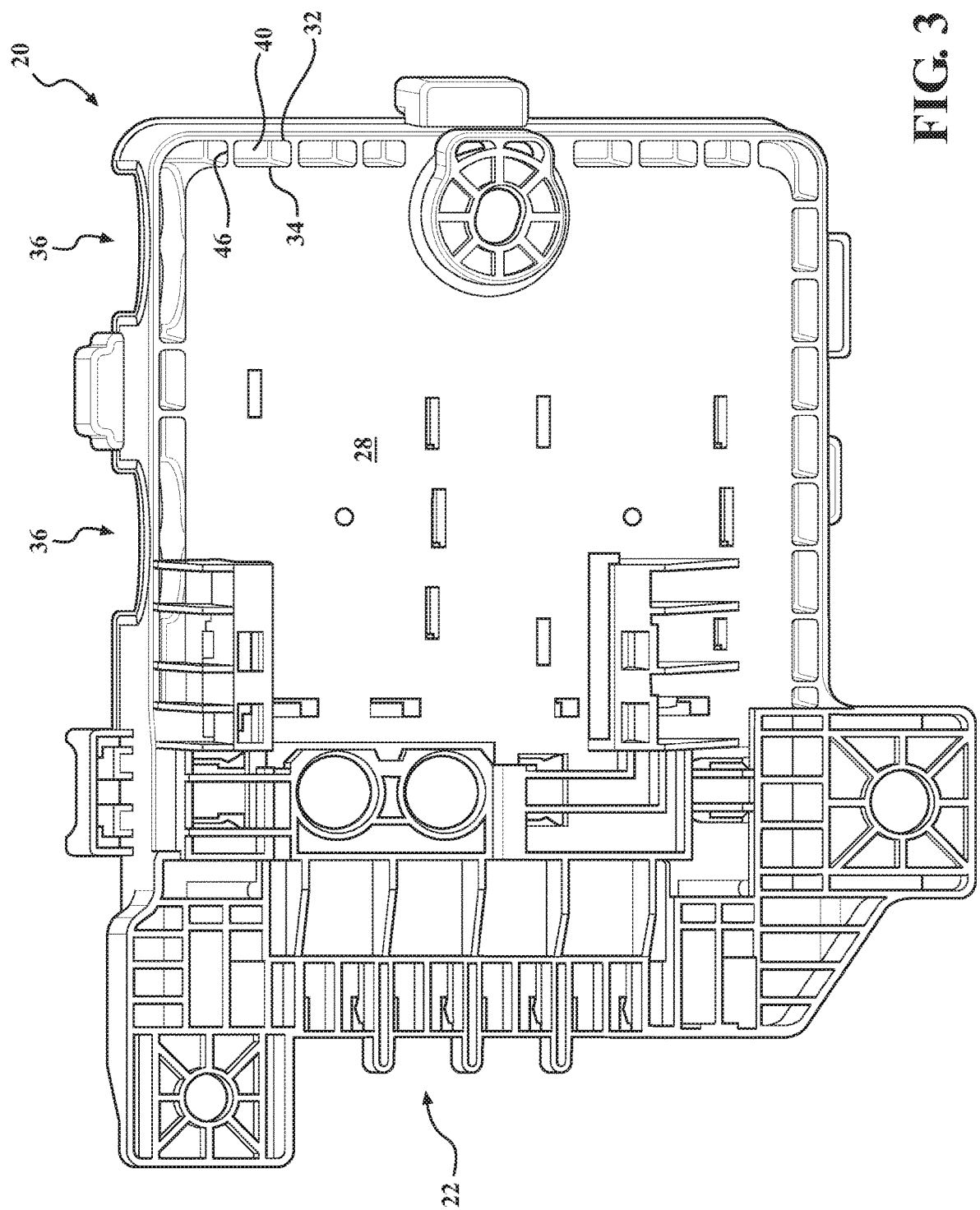
FIG. 3 is a bottom view of the bottom cover shown in FIG. 2.
Figure 4:
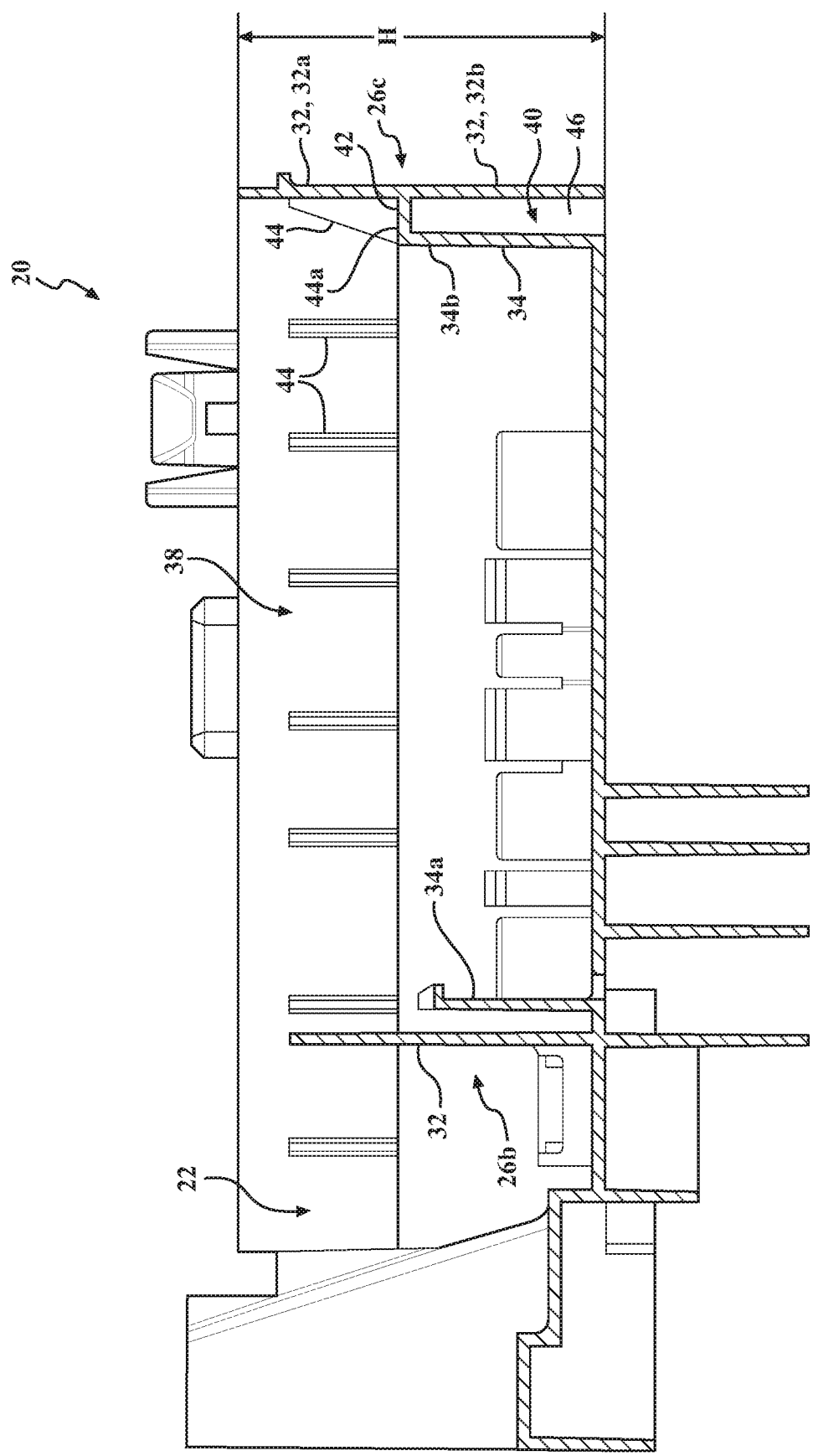
FIG. 4 is a cross-sectional view of the bottom cover shown in FIG. 2 taken along lines 4-4.

With reference now to FIGS. 3 and 4, a cross-sectional and bottom view of the bottom cover 20 is provided. The bottom wall 26 includes an outer wall 32 spaced apart from an inner wall 34 so as to define a gap 40. The bottom wall 26 bounds a portion of the peripheral edge of the floor 28 along three sides of the floor 28. One of the side bottom walls 26a is illustratively shown as having a pair of wire openings 36. The wire openings 36 are dimensioned to receive a portion of a wire harness coupled to respective connector assemblies seated within the partitions 30.

The inner wall 34 is also disposed along a peripheral edge of the floor 28 and is integrally formed to the peripheral edge of the floor so as to be interior of the outer wall 32. A portion 34a of the front bottom wall 26a extends between opposing sides of the floor 28 dividing the bottom cover 26a into a storage compartment 38 and the terminal housing 22. The inner wall 34 is a generally planar member orthogonal to the floor 28 and includes portions which may be axially offset from each other to accommodate the packaging constraints of the electric components.

With reference now to FIG. 4, a cross-sectional view of the bottom cover 20 is provided. FIG. 4 illustrates the outer wall 32 being spaced apart from the inner wall 34 so as to define the gap 40 there between. The gap 40 generally bounds the peripheral edge of the floor 28. The gap 40 may be uniform in width and height, or may vary depending upon the packaging needs of the storage compartment 38. The outer wall 32 is a generally planar member configured to be seated with the side wall of the upper housing 16.

A top lateral wall 42 connects the inner wall 34 to the outer wall 32. The top lateral wall 42 may be disposed on a top edge 34b of the inner wall 34 and presents a generally planar surface, which is spaced apart from and parallel to the floor 28. As the top lateral wall 42 extends from the inner wall 34, the top lateral wall 42 is also offset from the peripheral edge of the floor 28. In one aspect, the top lateral wall 42, the inner wall 34 and the outer wall 32 extend along the back and side bottom walls 26c, 26a of the bottom wall 26.

With reference again to FIG. 4, the inner wall 34 has a height referenced by the bidirectional arrow labeled "H" which is shorter than a height of the outer wall 32. The inner wall 34 and the outer wall 32 are illustratively shown as having a thickness which is generally uniform and equal to each other. However, it should be appreciated that the thickness of the inner wall 34 may be different than the thickness of the outer wall 32.

The top lateral wall 42 generally divides the outer wall 32 into an upper half 32a and a lower half 32b. The power distribution box 10 may further include a rib 44. The rib 44 is formed on a top surface of the top lateral wall 42 and is mounted to an inner surface of the outer wall 32. The rib 44 is preferably integrally formed to the top lateral wall 42 and the inner surface of the outer wall 32 and is illustratively shown as a fin-like member.

Figure 2:
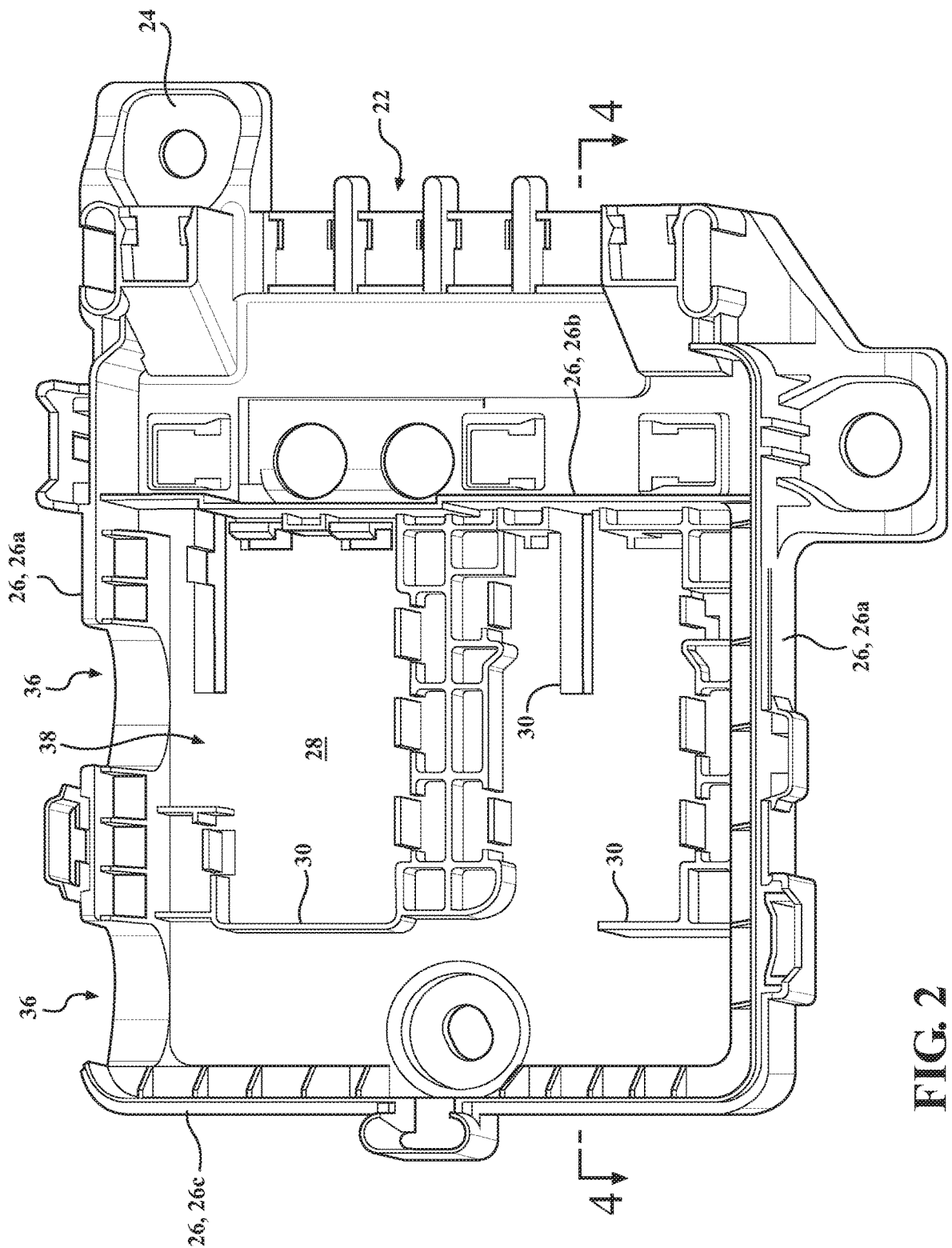
FIG. 2 is a top down view of the bottom cover shown in FIG. 1.

FIGS. 2 and 4 shows an embodiment where the power distribution box 10 includes a plurality of ribs 44. The ribs 44 are generally paired together. The ribs 44 disposed along the side surfaces 20b of the bottom cover 20 are generally equally spaced apart from each other whereas the ribs 44 along the back surface 20a of the bottom cover 20 are also generally equally spaced apart from each other but are closer to each other relative to the ribs 44 disposed on the side surfaces 20b.

It should be appreciated that the dimension of the ribs 44 provided herein are illustrative and not limiting to the scope of the appended claims. In this particular illustration, the ribs 44 have a base 44a which is generally equal to the width of the top lateral wall 42 and a height which is shorter than the height of the upper half 32a of the outer wall 32. However, it should be appreciated that the base 44a of the rib 44 may be shorter than the width of the top lateral wall 42 and the height of the rib 44 may extend to a top edge of the outer wall 32 so as to be commensurate in height with the upper half of the outer wall 32.

With reference again to FIG. 4 and now to FIG. 3. The power distribution box 10 may further include a side lateral wall 46. The side lateral wall 46 is disposed on a plane orthogonal to the top lateral wall 42. The side lateral wall 46 extends between the inner wall 34 and the outer wall 32 so as to define an elongated opening 48 between the inner and the outer walls 34, 32.

Preferably, the bottom wall 26 includes a plurality of side lateral walls 46 which are space apart from each other so, as to define a plurality of bottom openings 50 as shown in FIG. 3. The side lateral walls 46 may be coaxial to a respective rib 44. However, the ribs 44 and the side lateral walls 46 may be axially offset from each other. The side lateral walls 46 may have a height commensurate with the height of the lower half 32b of the outer wall 32.

In operation, the bottom cover 20 is assembled to the upper housing assembly 12 wherein the top lateral wall 42 integrally connects the outer wall 32 to the inner wall 34 so as to help the outer wall 32 retain its shape and alignment with the peripheral wall of the lower housing 18 of the upper housing assembly 12. Further, the ribs 44 help prevent the upper half 32a of the outer wall 32 from deforming radially outward with respect to the peripheral edge of the floor 28 and the side lateral walls 46 help ensure that the lower portion of the outer wall 32 retains its shape with respect to the peripheral edge of the floor 28 so as to prevent gaps from forming between the bottom wall 26 of the cover and the upper housing assembly 12, ensuring that the electrical components within the storage cavity remain protected from the environment.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A power distribution box for housing electrical components, the power distribution box comprising:
   an upper housing assembly; and
   a bottom cover, the upper housing assembly configured to cover the bottom cover, the bottom cover having a bottom wall bounding a peripheral edge of a floor, wherein the bottom wall includes an outer wall opposite an inner wall so as to define an opening, and a top lateral wall closing off a top of the opening and defining an open bottom, wherein the inner wall has a height shorter than a height of the outer wall.

2. The power distribution box as set forth in claim 1, wherein the top lateral wall is disposed along a plane parallel to the floor.

3. The power distribution box as set forth in claim 1, wherein the top lateral wall is disposed on a top edge of the inner wall.

4. The power distribution box as set forth in claim 1, wherein the bottom wall further includes a side lateral wall, the side lateral wall disposed on a plane orthogonal to the top lateral wall, the side lateral wall extending between the inner wall and the outer wall.

5. The power distribution box as set forth in claim 1, wherein the bottom wall further includes a pair of side lateral walls spaced apart from each other, the pair of side lateral walls disposed on a plane orthogonal to the top lateral wall, the pair of side lateral walls extending between the inner wall and the outer wall.

6. The power distribution box as set forth in claim 1, further including a rib, the rib disposed on a top surface of the top lateral wall and an inner surface of the outer wall.

7. The power distribution box as set forth in claim 1, further including a pair of ribs spaced apart from each other, each of the pair of ribs disposed on a top surface of the top lateral wall and an inner surface of the outer wall.

8. A power distribution box for housing electrical components, the power distribution box comprising:
   an upper housing assembly; and
   a bottom cover, the upper housing assembly configured to cover the bottom cover, the bottom cover having a bottom wall bounding a peripheral edge of a floor, wherein the bottom wall includes a front surface opposite of a back surface and a pair of side surfaces opposite of each other, the bottom wall further includes an outer wall opposite an inner wall so as to define an opening, wherein the inner wall has a height shorter than a height of the outer wall, and a top lateral wall closing off a top of the opening and defining an open bottom, the top lateral wall disposed along the front surface of the bottom wall.

9. The power distribution box as set forth in claim 8, wherein the top lateral wall is further disposed on the pair of side surfaces and the back surface of the bottom wall so as to bound the floor.

10. The power distribution box as set forth in claim 9, wherein the bottom wall further includes a side lateral wall, the side lateral wall disposed on a plane orthogonal to the top lateral wall, the side lateral wall extending between the inner wall and the outer wall.

11. The power distribution box as set forth in claim 8, further including a rib, the rib disposed on a top surface of the top lateral wall and an inner surface of the outer wall.

\* \* \* \* \*